United States Patent [19]

Barrall

[11] Patent Number: 4,956,321

[45] Date of Patent: Sep. 11, 1990

[54] SURFACE PACIFIED WOLLASTONITE

[75] Inventor: Jeffery L. Barrall, Lancaster, Pa.

[73] Assignee: Armstrong World Industries, Inc., Lancaster, Pa.

[21] Appl. No.: 207,227

[22] Filed: Jun. 16, 1988

[51] Int. Cl.$^5$ .................. C04B 12/02; C04B 33/02
[52] U.S. Cl. .................. 501/146; 501/123; 106/796; 106/690
[58] Field of Search .............. 501/122, 123, 145; 423/331; 106/85

[56] References Cited

FOREIGN PATENT DOCUMENTS 0653797 12/1962 Canada .................. 423/331
1159884 12/1983 U.S.S.R. .................. 423/331

OTHER PUBLICATIONS

NYCO Technical Data, NYCO.

*Primary Examiner*—Mark L. Bell
*Assistant Examiner*—Melissa Bonner

[57] ABSTRACT

Wollastonite acid treated and dried to pacify the surface processes more uniformly in subsequent reactions or remains inert when used as a filler. Phosphate cements prepared with the pacified wollastonite or similar calcium silicates exhibit improved strength and scratch resistance.

20 Claims, No Drawings

SURFACE PACIFIED WOLLASTONITE

FIELD OF THE INVENTION

The present invention relates to a method for treating calcium silicate. More particularly, the method treats the surface of particulate calcium silicate with an acid to convert a reactive surface to a relatively inert surface.

BACKGROUND OF THE INVENTION

Calcium silicates such as wollastonite are known in the art as materials used for the manufacture of building and insulating materials. Preparation of such materials is described in patents such as: Wheeler et al.—U.S. Pat. No. 2,992,930; Vikanovich et al.—U.S. Pat. No. 3,148,996; Magder—U.S. Pat. No. 3,330,675 and Barrall—U.S. Pat. No. 4,375,516.

Yet in spite of varieties of applications for wollastonite both in old and new compositions, a problem exists wherein variable results are encountered with different batches and grades of raw materials. Efforts to control the purity of wollastonite used for the preparation of building and insulating materials proved to be unsatisfactory in improving reaction uniformity. Thus, a need exists for means to control or limit variability associated with the use of wollastonite as a raw material.

The method of the present invention provides calcium silicate materials with improved properties for both reactive and inert applications.

SUMMARY OF THE INVENTION

The present invention provides a process for treating the surface of calcium silicate particles by the steps of: (a) reacting the calcium silicate in an aqueous acid medium to convert the surface without changing the bulk crystal structure, and (b) drying the surface reacted calcium silicate, wherein step (b) stops the reaction of step (a).

In a preferred embodiment of the invention, the calcium silicate is wollastonite with an average particle size of 3.5 microns and a MOH's hardness of 4.5 which is mixed while being treated with water and carbon dioxide at 140° F. (60° C.) before being dried to produce a pacified powder useful for preparing ceramic materials and cements.

DETAILED DESCRIPTION OF THE INVENTION

Wollastonite (CaSiO3) is a natural occurring metasilicate mineral similar to alite and pseudowollastonite. Wollastonite occur as a triclinic crystal with cleavage preferably occurring along the (100) and (001) planes to form acicular (needle shape) particles, and along the (101) plane to form splintery fragments. The structure of wollastonite consists of infinite $SiO_3$ chains, parallel to the b axis, with Ca in irregular octahedral coordination linking the chains.

A pure form of wollastonite gives the following analysis:

| Component | Percentage |
| --- | --- |
| CaO | 47.0 |
| $SiO_x$ | 50.0 |
| $Fe_2O_3$ | 1.0 |
| $Al_2O_3$ | 1.0 |
| MnO | 0.1 |
| MgO | 0.3 |
| $TiO_2$ | 0.05 |

A grade of 400 mesh wollastonite sold by NYCO, a division of Processed Minerals Inc., in Lewis, Essex County, N.Y., under the name of NYAD 400 is characterized by following average size 3.5 microns, aspect ratio 5-1, MOH's hardness 4.5, surface area B.E.T. 1.9 $m^2/gm$, and specific gravity 2.9.

It is envisioned that calcium silicates which can undergo surface reaction with atmospheric water and carbon dioxide under ambient conditions fit into the class of raw materials which can be benefitted by the present invention. In view of its wide range of industrial uses, wollastonite is the primary member of this class of calcium silicates.

Scientific analysis of the problem concerning variability in the reactivity of wollastonite in chemically-bonded ceramic material preparation revealed that slower reacting material correlated with "age" and pH of a water slurry. What is meant by "age" is the time from when the mineral was ground until when it was used in a reaction. The pH measurement was obtained by slurrying 20 g of wollastonite in 200 g of deionized water. In view of the crystal structure, the type of grinding was found to be significant since low or moderate sheer would tend to only break the crystals into smaller needles, whereas high shear mixing such as ball milling was indiscriminate and resulted in fractures in all directions resulting in shattered fragments which exposed more active internal surfaces. Upon examining different "age" samples of wollastonite, the slurry pH values ranged from 10.7-9.00 and for the same reaction the time varied from 2 minutes, 30 seconds to 1 hour, 7 minutes. Attempts to use higher purity wollastonite to solve the variability problem were not successful.

The solution to the variability problem by selectively reacting a naturally reactive surface represents the essence of the present invention. It was discovered that to overcome the natural but highly variable and uncontrollable reactivity of calcium silicate, it was necessary to allow the surface to convert to carbonate, sulfate, or equivalent displaceable anion such as acetate, but excluding phosphate which is a product of subsequent useful reactions in cement and ceramic manufacture. The acetate anion coming from acetic acid, while dilute sulfuric acid provides a convenient acid medium for sulfate surface conversion, pressurized carbon dioxide or dry ice with moist wollastonite provides the acid medium for carbonate surface conversion. Since carbon dioxide is an astmospheric component, it is necessary to dry the surface resulted calcium silicate once the desired degree of acid treatment is completed in the event that the pacified product will not be used soon afterwards. It is preferred to use in situ carbonic acid generation for ecological and economic reasons, but it is within the scope of the discovery to use other acid solutions which may be conveniently available for other purposes.

The term pacifying as used in describing the process of the present invention refers to converting calcium silicate from a continuously reactive material to a relatively inert and stabilized material. With hindsight this pacification process can be seen to be similar to surface reactions of metals which produce an oxide skin thereby halting further atmospheric attack. On the other hand, pacifying is not meant to involve extensive acid attack which will react internally and destroy the crystal structure. As such the pacifying process is a mild acid treatment which converts only the active and exposed surface without penetrating into the basic crystal structure. For example, while an elevated temperature above about 95° F. is conveniently used to speed up the rate of reaction when pacifying with weak in situ carbonic acid, no such temperature increase is required with much stronger dilute sulfuric acid.

While the very existence of a means to pacify calcium silicate was unknown prior to this discovery, it was further completely unexpected to find that the pacified substance gave superior results than had been found with untreated material. While the addition of untreated wollastonite to a phosphate cement increased viscosity with the sacrifice of bond strength, the addition of wollastonite prepared according to the present invention actually improved bond strength along with providing improved scratch resistance. Further, when wollastonite with natural carbonate on the surface is treated with diluted sulfuric acid, the carbonate converts to sulfate, thereby eliminating the possibility that carbon dioxide gas will be evolved in later processing steps. It is envisioned that the pacifying treatment may be applicable to other uses of calcium silicate in which reactivity or lack of it may be advantageous such as insulating materials, ceramics, fillers, thickeners, etc.

Important in the practice of the present invention is surface treatment of wollastonite particles by reaction of 2% or less of the total material, therefore without distorting the bulk crystal. Also, control of sulfuric acid within a normality of 0.015 to 0.005 contributes to a uniform pacificed surface. Samples can be examined for adequate degree of pacification by measuring the pH of the slurred wollastonite where typical pH values are 9-10.

The present invention provides an improved raw material widely used for cement, ceramic, insulation, filler, and other applications. A pacified material which can provide uniform reactivity or remain inert according to the desired application meets industrial needs for product and process uniformity.

The following examples, while not intended to be exhaustive, illustrate the practice of the present invention. Example 4 represents the best mode.

EXAMPLE 1

Wollastonite commercially available as 400 mesh NYAD 400 from NYCO was suspended in a 28 mesh sieve over 95° C. water within a Pyrex ® jar while a hot plate maintained the water temperature. After 15 minutes, carbon dioxide flooded the moist atmosphere within the jar for 2 minutes. After 30 minutes the wollastonite was removed and allowed to cool and dry. Comparison of the experimental sample with an untested sample using Thermal Gravimetric Analysis (TGA) showed a weight loss consistent with calcium carbonate formed on the surface decomposing to release carbon dioxide.

EXAMPLE 2

A sample of wollastonite was treated with 0.01N sulfuric acid for 1 minute, rinsed with deionized water and dried. A phosphate ceramic prepared as described in U.S. Pat. No. 4,375,516 incorporating the sulfate-treated wollastonite showed increased bond strength and improved MOH's hardness in comparison with a control containing untreated wollastonite. The control and experimental cement comprised:

| NYCO 400 | wollastonite | 83 parts |
|---|---|---|
| NYCO G | wollastonite | 31 parts |
| Al(OH)$_3$ | | 70 parts |
| 85% H$_3$PO$_4$ | | 100 parts |
| Water | | 25 parts |

Using acid treated wollastonite the cement gave a modulus of rupture (MOR) of 1,400 psi and MOH's hardness 4-5 versus 850 psi and 3-4 for the untreated control.

EXAMPLE 3

Experiments were run where wollastonite was exposed to moisture and dry ice. Table I contains comparative results for setting times for phosphate cements.

TABLE I

| Sample | Set Time |
|---|---|
| No treatment (control) | 3.5 minutes |
| 14 hours dry ice treatment | 49 minutes |
| 7 hours dry ice treatment | 25 minutes |

This shows the advantage of the pacifying process of the present inventions in extending cure time.

EXAMPLE 4

One hundred fifty pounds of 400 mesh wollastonite was placed in a Henschel mixer. Then six pounds of water was added slowly as the mixer paddles turned. When the water was uniformly distributed, the Henschel mixer was turned to high speed. When steam was observed issuing from the vent in the mixer lid, carbon dioxide gas was delivered into the mixer for 15 minutes. The carbonate-treated material was then removed and dried.

Control and experimental cements were prepared with the following formulation with parts by weight:

| Aluminum phosphate | 140 |
|---|---|
| Wollastonite | 80 |
| Magnesium oxide | 8 |

Table II contains comparison results.

TABLE II

| Control Containing Untreated NYAD 400 | | Invention Containing Treated NYAD 400 | |
|---|---|---|---|
| Time After Mixing | Cement Viscosity | Time After Mixing | Cement Viscosity |
| 10 seconds | 40 poise | 10 seconds | 40 poise |
| 60 seconds | 55 poise | 60 seconds | 40 poise |
| 120 seconds | 175 poise | 120 seconds | 120 poise |
| 180 seconds | 185 poise | 180 seconds | 120 poise |
| 240 seconds | 275 poise | 240 seconds | 120 poise |
| 300 seconds | 360 poise | 300 seconds | 130 poise |
| 360 seconds | 1,180 poise | 360 seconds | 130 poise |
| 400 seconds | Set | 720 seconds | 150 poise |
| | | 900 seconds | 170 poise |
| | | 1,100 seconds | 195 poise |
| | | 1,300 seconds | 350 poise |
| | | 1,400 seconds | 2,500 poise |
| | | 1,440 seconds | Set |

These results illustrate the improved viscosity stability and working time using wollastonite prepared according to the present invention.

What is claimed is:

1. A method for pacifying wollastonite comprising the steps:
   (a) reacting the wollastonite in an aqueous acid medium to convert its surface by reaction with the acid further providing that the acid gives the wollastonite a displaceable anion without altering crystal structure, and
   (b) drying the wollastonite wherein, step (b) terminates the step (a) reaction, to provide a pacified product wherein 2% by weight or less of the total wollastonite is reacted.

2. The method of claim 1 wherein, before step (a) the wollastonite was ground to expose some internal areas which were more active.

3. The method of claim 1 wherein the acid is sulfuric acid, having a normality of 0.015 to 0.005.

4. The method of claim 1 wherein the aqueous acid medium contained carbonic acid.

5. The method of claim 4 wherein the carbonic acid was generated either from
   (a) pressurized carbon dioxide, or
   (b) from carbon dioxide added to the aqueous medium.

6. The method of claim 1 wherein the acid is acetic acid.

7. The method of claim 1 wherein the pacified product has a degree of pacification whereby a slurry of the wollastonite will give a pH value in the range of 9-10.

8. An acid pacified wollastonite having 2% by weight or less of the wollastonite reacted with the acid, and having a displaceable anion provided by the acid.

9. The acid pacified wollastonite of claim 13 having a pH of 9-10 when slurried in water.

10. A shaped article containing acid pacified wollastonite.

11. The acid pacified wollastonite of claim 8 wherein the displaceable anion is carbonate, sulfate, or acetate.

12. The acid pacified wollastonite of claim 9 wherein the displaceable anion is carbonate, sulfate, or acetate.

13. The acid pacified wollastonite of claim 8 wherein the wollastonite had been ground, to thus expose more active internal surfaces, before it was pacified.

14. The acid pacified wollastonite of claim 9 wherein the wollastonite had been ground, to thus expose more active internal surfaces, before it was pacified.

15. Acid pacified wollastonite of claim 8 wherein the anion is a carbonate which was introduced by a reaction with carbonic acid that was generated in an aqueous medium, the said carbonic acid being generated either from pressurized carbon dioxide, or from carbon dioxide that was added to the aqueous medium.

16. A phosphate ceramic which was prepared from a reaction of phosphoric acid, a metal oxide, and wollastonite, the said wollastonite being an acid pacified wollastonite having a displaceable anion from the acid; wherein further, the acid pacified wollastonite which was used for the ceramic had a degree of pacification whereby, a slurry of the wollastonite would give a pH value in the range of 9-10.

17. The phosphate ceramic of claim 14 wherein the displaceable anion was either sulfate, acetate, or carbonate.

18. The phosphate ceramic of claim 17 wherein the anion was carbonate.

19. The phosphate ceramic of claim 18 wherein the carbonate was introduced to the wollastonite by a reaction with carbonic acid that was generated in an aqueous medium, the said carbonic acid being generated either from pressurized carbon dioxide, or from carbon dioxide that was added to the aqueous medium.

20. The phosphate ceramic of claim 14 wherein 2% by weight or less of the acid pacified wollastonite is combined with the anion from the acid.

* * * * *